Dec. 13, 1927.   1,652,670

E. HOPKINSON ET AL
TIRE FOR MOTOR VEHICLES
Filed June 24, 1922   2 Sheets-Sheet 1

Inventors.
John P. Coe and
Ernest Hopkinson
By their Attorney

Dec. 13, 1927.  
E. HOPKINSON ET AL  
TIRE FOR MOTOR VEHICLES  
Filed June 24, 1922  
1,652,670  
2 Sheets-Sheet 2

Inventors.
John P. Coe and
Ernest Hopkinson.
By their Attorney
Ernest Hopkinson

Patented Dec. 13, 1927.

1,652,670

UNITED STATES PATENT OFFICE.

ERNEST HOPKINSON AND JOHN P. COE, OF NEW YORK, N. Y.; SAID COE ASSIGNOR OF HIS RIGHT TO MORGAN & WRIGHT, A CORPORATION OF MICHIGAN.

TIRE FOR MOTOR VEHICLES.

Application filed June 24, 1922. Serial No. 570,714.

Casings for motor vehicles at the present time are made of a carcass consisting of a variable number of plies of fabric anchored at their opposite margins to extensible or inextensible bead members and an outer sheathing of rubber composition varying in thickness but usually, if not invariably, most thick at the tread where the wear is greatest. The building of the multi-ply carcass requires skillful workers and much time. Separation inevitably follows faulty workmanship or lack of vigilance in all stages of compounding the stocks. The fabrics employed are more expensive than rubber. And the walls of the casing are comparatively thin and permit punctures more easily than is desirable.

The present invention is a casing of vulcanized rubber composition without a multi-ply fabric carcass of stress-resisting elements anchored at their opposite ends to the beads—although a sheet or sheets of fabric may be employed as a facing and not to substantially limit the distensibility of the casing when inflated by the inner tube—which casing as compared with its predecessors may be built more rapidly and without as skilled workmen, which eliminates many disadvantages and costs attending manufacture, and which insures against punctures to a very desirable degree, if not absolutely for all practical purposes. And these aims and advantages are realized in the type of casing that is demountable and attachable by the user, and that affords a shock absorbing support or cushion for the vehicle comparable, if not fully equal, to the present day casing with a multi-ply fabric carcass and rubber tread.

Various embodiments of the principles of the invention are illustrated in the accompanying drawings, in which:—

The casing may be in various forms and any suitable and convenient method of manufacture may be employed.

Figure 1:
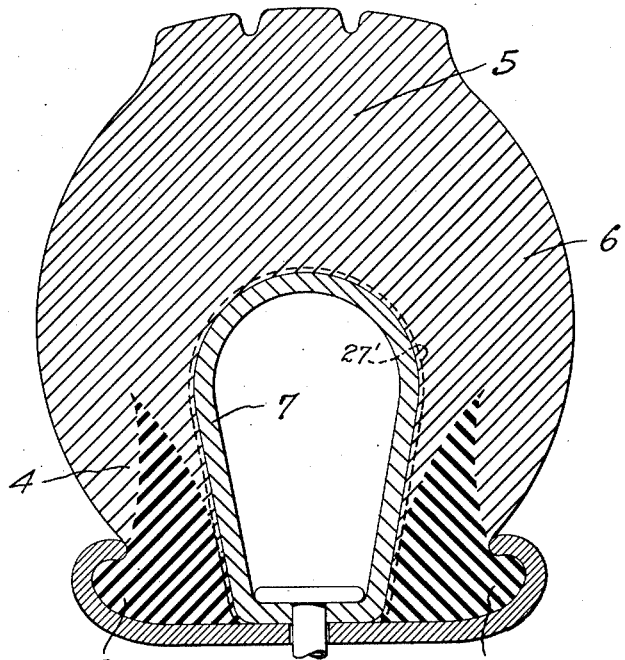
Fig. 1 is a cross section of a clincher type of casing especially suitable for passenger cars.

In Fig. 1 is disclosed a clincher type of casing equipped marginally with bead members of relatively hard vulcanized rubber composition 8, which may extend up the side walls to a suitable distance, such as that indicated, to stiffen the casing somewhat adjacent the rim flanges. The composition 8 is preferably blended into the margins or skirts 4 of the tread 5, which is made of a softer vulcanized rubber composition such as yields under load much the same as the present day tread stocks. The tread 5 and side 6 of the casing are relatively thick and rigid, and capable of carrying some of the load that is designed to be supported primarily, or most largely, in service by the inner tube 7. This latter, enclosed as usual in the casing, is somewhat smaller than customary to permit the walls of the casing being made entirely of vulcanized rubber composition thick enough to resist the stresses produced upon inflation of the inner tube to a riding pressure. The inner tube may be introduced and removed as usual. In addition to furnishing the requisite quick responsiveness to shocks, the inner tube is relied upon to hold the margins of the casing to the rim and render the casing demountable and hence, practical for ordinary users without resort to a service station for help.

The bead members 8 are made extensible enough for mounting on a one-piece unbroken clincher rim. The side walls from the beads toward the tread are progressively reduced in hardness so as to increase in flexibility toward the road-engaging tread, this being accomplished in any convenient fashion, as by varying the sulphur incorporated in the walls, or by splicing, or otherwise blending, together strips of green stocks which have been variously compounded, to gradually diminish the hardness of the composition from the beads toward the tread.

Figure 2:
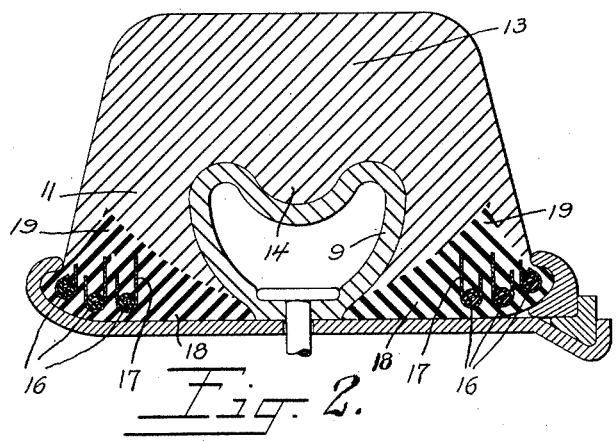
Fig. 2 is a cross section of a clincher type of casing particularly suitable for trucks.

In Fig. 2 of the drawings is illustrated a clincher type of casing which is especially suitable for trucks—although it may be used on passenger cars if desired. In this figure of the drawings, the casing shown is a little wider than deep so as to permit of encasing an inner tube. This enables the side wall 11 being made short in a direction radially of the wheel and therefore relatively stable and inflexible against lateral distortion, especially suiting them to resist side sway consequent upon turning the vehicle. Upon inflation, the tread 13 is bulged out slightly. This insures immediate cushioning of the load by the compressed air in the tube and renders the tire predominately pneumatic. Abnormally large shocks, however, beyond the capacity of the inner tube to sustain by reason of the limited area thereof, which is brought into play, are ultimately resisted by the cushioning side walls 11. In Fig. 2, the tread 13 is shown equipped with an inner nose or annular rib 14, which is designed not only to supplement the cushioning action of the side walls, but also in the remote event of puncture, to assist in holding the margins of the casing to the rim.

The bead members for the type of casing illustrated in Fig. 2 may be of any suitable construction. A preferred form is as is illustrated in Fig. 2 in which previously cured hard-rubber covered wires 16 are shown surrounded by more or less vertically disposed strips of fabric 17, which are imbedded in the harder rubber composition 18, which may be carried as illustrated at 19 part way up into the side walls of the casing. As in the previously described construction of Fig. 1 the hard rubber may be blended into the soft rubber so as not to present a clear, sharp line of demarkation between the hard and soft rubber stocks and so as to gradually increase the flexibility of the walls from the beaded margins toward the tread.

Figure 3:
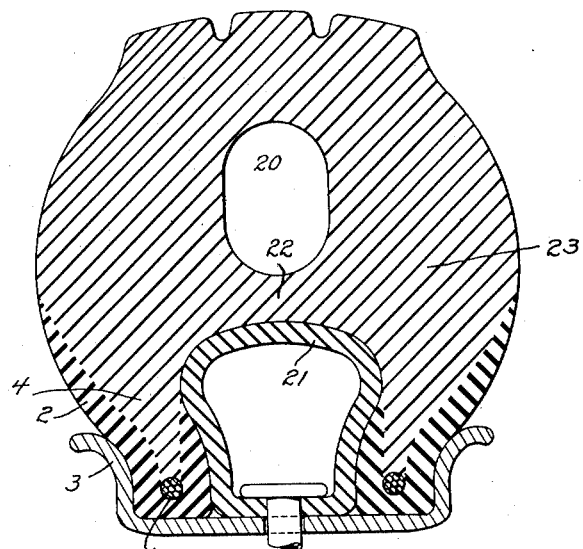
Figs. 3 and 4 are cross-sections of straight-side casings provided respectively with horizontal and vertical webs or walls capable of utility with more or less advantage as a cushioning means.
Figure 4:
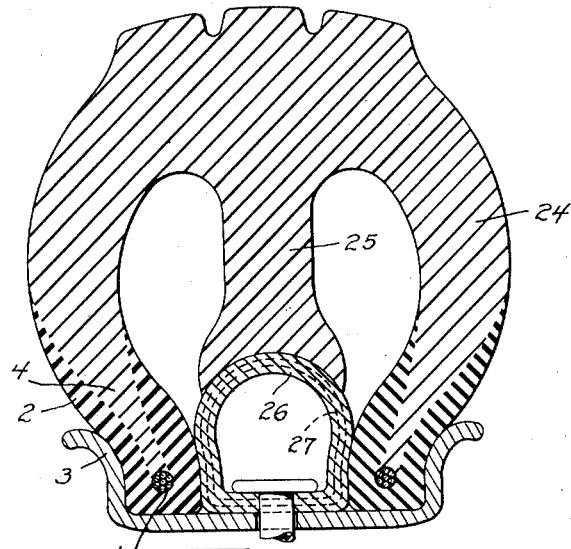

In Figs. 3 and 4 of the drawings are illustrated two modifications whose rim-engaging portions are beaded and reinforced with hard rubber composition extending up into their side walls and blending into the soft rubber composition in substantially the same manner as described in connection with Fig. 1 of the drawings. The tread of the casing shown in Fig. 3 however is hollowed out to provide a completely enclosed cavity 20 and is also channeled or divided adjacent its inner periphery to provide a space for receiving an inflatable tube 21. Between the annular cavity 20 and the inner tube 21, a horizontally disposed web 22 of vulcanizable rubber composition is formed to stay the side walls 23 against bulging.

In Fig. 4 of the drawings, a casing is illustrated with side walls 24 of slightly reduced thickness and there is provided a centrally disposed and vertically extending web 25 which is designed to rest upon and be supported by an inner tube 26, preferably reinforced with one or more incorporated plies of fabric 27 to limit its distension without impairing its flexibility to an impractical extent. In both Figs. 3 and 4, the inner tube is primarily a means for securing the reinforced margins of the casing to the rim.

In all the above described forms of the invention, it will be noted that the casing is made entirely of vulcanized rubber composition excepting at its rim-engaging portions where it may be equipped with any suitable construction for totally, or largely, resisting distension when the inner tube is inflated. Inextensible bead wires may be employed, or semi-extensible beads of the kind commonly employed in clincher casings, in the past, and these may be used with or without fabric or hard rubber surrounding them. No plies of fabric having stress-resisting-elements anchored as heretofore at their opposite ends to the bead members are employed and, therefore, have to be folded around the bead members and built into the tire at great expense. If desired, the fabric facing, such as indicated at 27′, Fig. 1 of the drawings, may be employed to line the tube receiving cavity but this is manifestly incapable of resisting the distending stresses set up by inflation of the inner tube, these stresses being intended to be borne, according to our invention, chiefly, if not entirely, by the all-rubber structure of the casing.

If the casing is relatively high, we prefer to stiffen the side walls from the beads toward the tread and to an extent increasing with the height of the casing, but in all cases terminating short of the junction of the tread portions of the casing with the side walls. And preferably, this is accomplished by making the composition of the stock of harder and harder character from the tread to the beads to the end that the casing will be stiffest where it engages the rim, and therefrom gradually decrease in stiffness and increase in flexibility towards the tread. But if the side walls of the casing be relatively short and the rim-engaging portions comparatively thick so that by its form the casing resists lateral deformation, as when a vehicle upon which it is mounted is turned or sways, we may omit this feature entirely and employ soft rubber of identically the same composition throughout. Of course, any suitable vulcanizing agent may be employed, quick or cold-curing as well as those functioning when heat is applied to the green article. In this connection, distinction is made between the hard rubber employed for stiffening the margins of the casing and the hard rubber employed to encase the bead members or grommet wires, the latter being optional in all forms of the invention although their use is dictated by experience in the art.

The principles of the invention may be employed in a wide variety of forms and constructions, those illustrated being disclosed merely for the purpose of indicating the breadth of the invention and not with any limiting intention, and therefore reference should be made to the accompanying claim for an understanding of the scope of the invention.

Having thus described our invention, what we claim and desire to protect by Letters Patent is:

A pneumatic tire casing for motor vehicles having bead members adapted to fit a rim and being made entirely of vulcanized rubber composition between said bead members and progressively increasing in flexibility from its margins towards its tread.

Signed at New York, New York, this 23rd day of June, 1922.

ERNEST HOPKINSON.

Signed at New York, New York, this 23rd day of June, 1922.

JOHN P. COE.